United States Patent [19]

Hotomi et al.

[11] Patent Number: 5,376,169
[45] Date of Patent: Dec. 27, 1994

[54] RECORDING SOLUTION FOR INK JETTING

[75] Inventors: Hideo Hotomi, Ibaraki; Hideaki Ueda, Kishiwada, both of Japan

[73] Assignee: Minolta Camera Kabushiki Kaisha, Osaka, Japan

[21] Appl. No.: 45,871

[22] Filed: Apr. 15, 1993

[30] Foreign Application Priority Data

Apr. 15, 1992 [JP] Japan ............................ 4-095166

[51] Int. Cl.$^5$ ...................... C09D 11/02; C09D 11/14
[52] U.S. Cl. ................... 106/23 C; 106/23 F; 106/25 R; 106/20 C; 106/20 D; 106/499; 106/500; 106/501; 523/160
[58] Field of Search .............. 106/20 C, 20 D, 23 R, 106/23 C, 23 F, 23 H, 22 C, 22 F, 22 H, 24 B, 25 R, 26 R, 25 A, 27 A, 30 R, 25, 26, 30, 501, 499, 500; 523/160

[56] References Cited

U.S. PATENT DOCUMENTS

| | | | |
|---|---|---|---|
| 3,475,187 | 10/1969 | Kane | 106/23 F |
| 4,283,320 | 8/1981 | Carroll et al. | 260/29.6 |
| 4,290,072 | 9/1981 | Mansukhani | 346/1.1 |
| 4,342,672 | 8/1982 | Lindroth et al. | 524/29 |
| 4,365,035 | 12/1982 | Zabiak | 524/283 |
| 4,388,427 | 6/1983 | Nishikawa et al. | 523/500 |
| 4,545,819 | 10/1985 | Shioi et al. | 106/23 F |
| 4,689,078 | 8/1987 | Koike et al. | 106/22 |
| 4,842,646 | 6/1989 | Gamblin | 106/22 |
| 5,010,125 | 4/1991 | Kruse et al. | 524/308 |

FOREIGN PATENT DOCUMENTS

| | | | |
|---|---|---|---|
| 56-147860 | 11/1981 | Japan | C09D 11/00 |
| 56-147861 | 11/1981 | Japan | C09D 11/00 |
| 56-147862 | 11/1981 | Japan | C09D 11/00 |

*Primary Examiner*—Paul Lieberman
*Assistant Examiner*—Margaret Einsmann
*Attorney, Agent, or Firm*—Willian Brinks Hofer Gilson & Lione

[57] ABSTRACT

There is disclosed a recording solution for ink which is excellent in dispersibility, keeping quality, stability, fixing properties and able to effect printing without bleeding and opposite-side bleeding. The recording solution for ink jetting comprises at least:

a nonaqueous solvent, a pigment, a resin and at least one of additives selected from the group consisting of alginates and borneols.

30 Claims, 1 Drawing Sheet

RECORDING SOLUTION FOR INK JETTING

BACKGROUND OF THE INVENTION

1. Field of the Invention

The present invention relates to a recording solution for ink jetting used in an ink-jet printer.

2. Discussion of Related Art

An ink-jet printer prints letters, figures and pictures on paper by emitting ink through a small nozzle. Aqueous or nonaqueous recording solutions for ink jetting are known but basic characteristics which are required of such solutions are as follows;

they should be stable for long-term keeping quality and should not cause choking in an ink-jet printer;

they should be capable of being smoothly and securely fixed on image-recording material (paper, film etc.), and should provide clear images and little bleeding around printed dot-images;

printed images should be clear tone and high density;

printed images should be excellent in water resistance and light resistance;

they should not stain peripheral devices around a recording solution (e.g., container, connecting tube, sealing materials etc.) dirt;

should be excellent in safety, that is, have no smell, no toxicity and no flammability;

aqueous ink should have little smell and toxicity and be excellent in safety, i.e., it should not be flammable.

However because the ink contains an aqueous dye, printed images are influenced by the dye. Therefore the ink is poor in water resistance and light resistance. In order to avoid such problems, a pigment is used instead of the dye. It is, however, difficult to disperse the pigment finely and uniformly because of insolubility of the pigment, resulting in poor keeping quality. Further water is liable to be vaporized, so that the ink is liable to choke the emitting part of the ink in an ink-jet machine.

SUMMARY OF THE INVENTION

The present invention provides a recording solution for ink jetting which contains a nonaqueous solvent.

The object of the present invention is to provide a recording solution for ink jetting which is excellent in dispersibility, stability and fixing properties, even after it is left standing for a long time.

Another object of the present invention is to provide a recording solution for ink jetting which is able to form printed images without choking, bleeding and opposite-side bleeding, even when printing speed is high.

A recording solution for ink jetting of our invention comprises:

(a) a dispersing medium which comprises a nonaqueous solvent;

(b) at least one of coloring materials selected from the group consisting of pigments, resin particles having a pigment dispersed therein, and microcapsules particles containing a dye or a pigment therein, the coloring material being insoluble in the nonaqueous solvent and (c) at least one of additives selected from the group consisting of alginates, borneols, celluloses and polysaccharides, the additives being present in the recording solution in the amount of 0.001-5 percent by weight.

In an alternative embodiment, the recording solution for ink jetting may also comprise a dye which is soluble in the dispersing medium. In such an event, the content of the coloring materials is adjusted so that the total content of the coloring materials and the dye is within the limits allowed for the coloring materials of the recording solution.

BRIEF DESCRIPTION OF THE DRAWINGS

FIG. 1 (*a*) shows a relationship between viscosity and shear rate.

FIG. 1 (*b*) shows a relationship between viscosity and shear rate.

DETAILED DESCRIPTION OF THE INVENTION

The present invention relates to a recording solution for ink jetting comprising at least:

a dispersing medium comprising a nonaqueous solvent, at least one of coloring materials selected from the group consisting of pigments, resin particles having a pigment dispersed therein, and micro-capsule particles containing a dye or a pigment therein, and at least one of additives selected from the group consisting of alginates, borneols, celluloses and polysaccharides, the additives being present in the amount of 0.001-5 percents by weight in the recording solution.

The recording solution for ink jetting of the present invention is a uniform solution containing a coloring material dispersed in the dispersing medium and the other components dissolved or compatibilized therein. The recording solution is excellent in fixing properties, keeping quality and stability. In particular, the specified addition of at least one of the additives effects excellent dispersibility of the coloring materials as well as the solution properties described above. Printed images produced with the solution are excellent without bleeding and opposite-side bleeding.

The recording solution for ink jetting of the present invention comprises at least the dispersing medium, coloring material, the resin and the additive.

A nonaqueous solvent is used as the dispersing medium. The nonaqueous solvent means the solvent except water. Among these nonaqueous solvents, the ones having a boiling point of 150 ° C. or more, preferably 180 ° C. or more are used. With solvent having a boiling point of less than 150 ° C., a vaporizing speed is high, so that poor dispersibility, separation-out of aggregations, and shaking of nozzle may be caused. The nonaqueous solvent having a boiling point of at least 150° C. is present in the recording solution for ink jetting in the amount of at least 55% by weight.

In one embodiment, the nonaqueous solvent is exemplified by;

mono-, di-, tri- or tetraalkylene glycol alkyl ethers such as ethylene glycol monoalkyl ether (bp:150°-250° C.), diethylene glycol monoalkyl ether (bp:150°-250 ° C.), triethylene glycol monoalkyl ether (bp:249°-300 ° C.), propylene glycol monoalkyl ether (bp:190°-250 ° C.), tripropylene glycol monoalkyl ether (bp:243°-300 ° C.) and (mono, di, tri) alkylene glycol (bp:150°-300° C.), alkylene glycol alkyl ether acetates (bp:150°-300° C.), pyrrolidones, such as 2- pyrrolidone (bp:245 ° C.) and N-methylpyrrolidone (bp:202 ° C.), and a mixture thereof.

Other nonaqueous solvents which can be used in the present invention are those having a boiling point of 150 ° C. or more, such as heterocyclic alcohols, phenols, pyrrolidones, esters (adipates, azelates, sebacates, maleates, fumarates, phosphates, ricinoleates, heterocyclic esters).

Among those solvents, (mono, di, tri)ethylene glycol monobutyl ether, (mono, di, tri)propylene glycol monobutyl ether, butyl Cellosolve and 2 pyrrolidone are preferable from the points of view of dispersibility of coloring materials, solubility of resins, printing characteristics, maintenance of ink-jet head and similar properties.

With the coloring materials, one of the components of the recording solution, various kinds of organic or inorganic pigments including conventional ones may be used. Such coloring materials are exemplified by azo series, phthalocyanine series, quinacridone series, anthraquinone series, dioxazine series, indigo series, benzidine series, thioindigo series, perinone series, perylene series, isoindolenone series, titanium oxide, cadmium series, iron oxide series, carbon black and the like.

Specific coloring materials which can be used in the present invention are exemplified below, referring to color index (C.I.) number:

Yellow pigments: C.I. 13, 24, 86, 93, 94, 108, 109, 110, 117, 125, 137, 138, 147, 153, 154, 166, 168;

Orange pigments: C.I. 36, 43, 51, 55, 59, 61;

Red pigments: C.I. 97, 122, 123, 149, 168, 177, 178, 180, 187, 190, 192, 209, 215, 216, 217, 220, 223, 224, 226, 227, 228, 240;

Violet pigments: C.I. 19, 23, 29, 30, 37, 40, 50;

Blue pigments: C.I. 15, 15:1, 15:3, 15:4, 15:6, 22, 60, 64;

Green pigments: C.I. 7, 36;

Brown pigments: C.I. 23, 25, 26;

Black pigments: C.I. 7, 1;

These coloring materials may be dissolved in the solvent, but usually they can not be dissolved. A mean volume particle size of the coloring materials is 0.001–30 $\mu$m, preferably 0.001–10 $\mu$m, more preferably 0.01–4 $\mu$m. If the mean volume particle size is larger than 30 $\mu$m, dispersing stability becomes poor which may cause choking of nozzle and aggregations during ink-preservation. If the mean value is smaller than 0.001 $\mu$m, dispersing stability becomes poor and more thixotropic, and the density of printed images is not sufficient.

The coloring materials are present in a content of 1–20 percents by weight, preferably 1.5–15 percent by weight, on the basis of the composition of the recording solution. If the content is less than 1 percent by weight, the density of printed images is too low to be used satisfactorily as a recording solution. If the content is larger than 20 percents by weight, dispersibility may become poor, which may cause thixotropy and an ink-emitting trouble.

Particles containing a pigment dispersed in a resin or a resin containing micro-capsule particles which contain a dye or a pigment, dispersed in the resin may be used as a coloring material. The mean particle size of these coloring materials is adjusted to 5 $\mu$m or less, preferably 0.01–2 $\mu$m. A resin comprising a pigment dispersed in the resin particles or micro-capsule particles containing a dye or a pigment can be any resin which is not soluble in the dispersing medium. A conventional resin applied to toner may be used. When a thermoplastic resin is used, fixing properties may be improved through a fixing process by pressure or heating. When a photosetting resin is used, particles are cured by irradiation of light to improve fixing properties. With respect to the micro-capsule particles, conventional micro-capsule particles used as toner particles may be used. Such micro-capsule particles are disclosed in, for example, Japanese Patent Laid-Open Nos. Sho 59-65854, 60-88956, 60-254049, 62-283346, 62-283347, 63-32559, 63-89867 and 63-179366.

When light-transmittance and color are to be further improved, a dye which can be dissolved in the dispersing medium may be added to the solution. Such a dye is soluble in the dispersing medium. The dye content in the solution is 0.5–10 percent by weight. In this case, the coloring material such as pigments and particles containing a pigment dispersed in a resin are added to a composition of the recording solution in such quantities that the content of the coloring particles in the solution is 0.5–10 percent by weight. It is preferable that the total amount of the coloring material and the dye is adjusted to 1–20 percent by weight of the solution and that the weight ratio of the coloring material to the dye is adjusted within the range between 1:8 to 8:1.

A resin used for a recording solution for ink jetting is made to be dissolved in the recording solution and works to improve dispersibility of coloring materials and fixing properties of ink on paper and to prevent ink from spreading. Such a resin is exemplified by butyral resins, such as polyvinylbutyral, acrylic resins, such as an aqueous acrylic resin, alkylene glycols, such as polyethylene glycol, rosin resins, vinyl alcohol resins, such as polyethylene glycol, polyvinylpyrrolidone resins. In particular, butyral resins, aqueous acrylic resin, polyvinyl alcohol, polyvinylpyrrolidone and polyethylene glycol are preferable. When the butyral resins are used, the ones having a molecular weight of 2,000–100,000, preferably 3,000–10,000 are preferable from the view point of dispersing stability. These resins for a recording solution are contained at a content of 0.01–10 percents by weight, preferably 0.05–8 percent by weight, more preferably 0.1–7 percent by weight on the basis of the composition of the recording solution for ink jetting. If the content is less than 0.01 percent by weight, the dispersibility of ink becomes poor. If the content is larger than 10 percent by weight, the viscosity of ink becomes high. The aggregation of coloring materials is observed after ink is dried.

Additives for a recording solution for ink jetting of the present invention are selected from the group of alginates, borneols, celluloses and polysaccharides. These additives are used in combination. The additives are made to be dissolved in the recording solution and work effectively to improve dispersibility of the recording solution and to prevent ink from bleeding into recording paper and opposite-side bleeding. As alginates, metal alginates and ammonium alginates may be exemplified. As borneols, borneol and isoborneol are exemplified. As celluloses, methyl cellulose, ethyl cellulose and nitrocellulose are exemplified. As polysaccharides, ester of sucrose, starch, konjak powder and glucose are exemplified.

The additives are contained at a content of 0.001–5 percent by weight, preferably 0.003–4.5 percent by weight, more preferably 0.05–4 percent by weight on the basis of the composition of the recording solution for ink jetting. If the content of the additives is less than 0.001 percent by weight, bleeding and opposite-side bleeding becomes remarkable. If the content is larger than 5 percent by weight, the viscosity of the recording solution becomes high, flowablity of the recording solution becomes poor and dispersibility of the recording solution becomes also influenced adversely.

In the present invention, other additives, for example, a humectant, an emulsifying agent and a drying-preventive agent may also be added. In one embodiment, humectants are exemplified by alcoholamines (triethanolamine and similar alcoholamines), alkylamines (triethylamine and similar alkylamines) and aliphatic lower alcohols (ethanol, propanol, hexanol and similar alcohols), emulsifying agents by aromatic polyglycol ether, alkyl aryl polyglycol ether and sorbitan monooleate, and drying-preventive agents by alkyl naphthalene sulfonate and alkyl aryl sulfonate. When used, these additives are added at a content of 0.05-5 percent by weight on the basis of the composition of the recording solution for ink jetting. If the content is smaller than 0.05 percent by weight, the properties imparted by the addition of such additives may not be achieved cannot be given. If the content is larger than 5 percent by weight, the composition of the solution is liable to change because of easy evaporation of the additives, resulting in poor preservation stability. These other additives are selected from the ones which can be dissolved in the recording solution.

In the present invention, a second type of other additives, such as 2, 2'-dithioethanol, formamide, glycerine, ethylene carbonate and methanesulfonic acid, may be further added according to kinds and types of an ink-jet printer.

It is necessary to add water to a jet-ink for a printer of bubble-jet type. The addition of water is effective when a recording solution has possibility to ignite unless water is added. The above second type of other additives works to prevent bleeding of printed images, feathering and opposite-side bleeding. These additives are added within the range between about 7 and 45 percent by weight to the composition of a recording solution for ink jetting. If the amount of such additives is larger than 45 percent by weight, a fixing rate of ink onto paper becomes slow, and this may cause offset on another paper.

A recording solution for ink jetting of the present invention may be prepared by mixing, stirring and kneading the above-mentioned materials. During the production of the recording solution for ink jetting, a resin, a solvent, a dispersing agent and similar compounds may be added again if necessary. In any of the production processes, including the final process, big particles may be eliminated by filtration or the solution may be deaerated in vacuo.

Apparatus for the production of the recording solution for ink jetting is available in the market and concretely exemplified by a ball mill pot, a paint-conditioner, a circulating homogenizer of ultrasonic-wave type, a sand mill, a dispersing machine of ultrasonic-wave type or a roll mill.

It is preferable from the view points of producing stability and ink-jetting stability that the production of the recording solution for ink jetting is carried out in clear and dry atmosphere. When the above processes are carried out with the whole machine kept at a constant temperature, a recording solution for ink jetting more excellent in dispersing stability can be obtained.

A viscosity of the recording solution for ink jetting is finally adjusted according to an ink-jetting system. With respect to the ink-jetting system, a continuous-emitting type (continuous type), a volume-change-emitting type (piezo type), an electrostatic type and a bubble-jet type (thermal ink-jet type) are known. The adjustment of the viscosity and the surface tension may be achieved by adjusting adequately a composition, combination, ratios and other parameters.

In the case of the continuous-emitting type (continuous type), the viscosity is adjusted to 2.2-20 cp, preferably 2.5-10 cp, and the surface tension is adjusted to 15-65 dyne/cm, preferably 20-60 dyne/cm. If the viscosity is larger than 20 cp, the recording solution is hard to be emitted through a nozzle. If the surface tension is smaller 15 dyne/cm, the recording solution may drop out of a nozzle.

In the case of the volume-change-emitting type, the viscosity is adjusted to 2.2-30 cp, preferably 2.5-20 cp and the surface tension is adjusted to 20-60 dyne/cm, preferably 25-60 dyne/cm. If the viscosity is larger than 30 cp, the recording solution cannot be provided sufficiently. If the surface tension is smaller than 20 dyne/cm, a recording solution may drop out of a nozzle.

In the case of the electrostatic type, the viscosity is adjusted to 2.2-40 cp, preferably 2.5-30 cp and the surface tension is adjusted 15-60 dyne/cm, preferably 20-55 dyne/cm. If the viscosity is larger than 40 cp, the recording solution is hard to be emitted through a nozzle. If the surface tension is smaller than 15 dyne/cm, a recording solution may drop out of the nozzle.

In the case of the bubble-jet type, the viscosity is adjusted to 2.2-30 cp, preferably 2.5-20 cp and the surface tension is adjusted 15-65 dyne/cm, preferably 20-60 dyne/cm. If the viscosity is larger than 30 cp, the recording solution cannot be provided sufficiently and moreover it is hard to emit it through a nozzle. If the surface tension is smaller than 15 dyne/cm, the recording solution may drop out of a nozzle.

In the case of a heat-electrostatic system disclosed in Japanese Patent Application Hei 3-296797, the viscosity is adjusted to 4-200 cp, preferably 4-100 cp and the surface tension is adjusted to 25-55 dyne/cm, preferably 25-50 dyne/cm. If the viscosity is larger than 200 cp, a recording solution is hard to be emitted through a nozzle. If the surface tension is smaller than 15 dyne/cm, the recording solution may drop out of a nozzle.

The lower limit of the viscosity and the upper limit of the surface tension are specified from the view point of the respective composition of recording solutions for ink jetting.

PRODUCTION EXAMPLE 1 OF RECORDING SOLUTION FOR INK JETTING (Examples 1-30 and Comparative Examples 1-7)

Solvents, pigments, dispersing agents and additives as shown in Tables 1-13 were treated under the following conditions:

In Examples 1-12, for 4 hours in a paint conditioner (made by Red Devil K.K.),

In Examples 13-20, for 2 hours in a circulating Homogenizer of ultrasonic-wave type (made by Nippon Seiki K.K.), In Examples 21-24, for 1.5 hours in a dispersing machine UT-20 of ultrasonic-wave type (made by Shinmeidai Kogyo K.K.), In Examples 25-30, for 3 hours in a paint conditioner (made by Red Devil K.K.), and In Comparative Examples 1-6, for 4 hours in a paint conditioner (made by Red Devil K.K.).

The figures in Tables refer to percent by weight on the basis of the recording solution.

TABLE 1

|  | Example 1 | Example 2 | Example 3 |
|---|---|---|---|
| solvent | triethylene glycol monobutyl ether (bp 271° C.) [93.5] | diethylene glycol monobutyl ether (bp 230° C.) [87.2] | dipropylene glycol monoethyl ether (bp 162–228° C.) [88.7] |
| coloring material | carbon black CONDUC TEX 975 BEADS (Colombian. Carbon K.K.) [5.0] | carbon black MOGUL L (Cabot K.K.) [5.8] | carbon black MA-8 (Mitsubishi Kasei Kogyo K.K.) [7.2] |
| resin | butyral resin BL-1 (Sekisui Kagaku K.K.) [1.5] | butyral resin BL-2 (Sekisui Kagaku K.K.) [2.5] | butyral resin BL-3 (Sekisui Kagaku K.K.) [2.0] |
| additive (1) | borneol [0.003] | borneol [4.5] | methyl cellulose [2.1] | value in [ ] means wt %.

TABLE 2

|  | Example 4 | Example 5 | Example 6 |
|---|---|---|---|
| solvent | 2-pyrrolidone (bp 245° C.) [89.9] | diethylene glycol monobutyl ether (bp 230° C.) [82.0] | 2-pyrrolidone (bp 245° C.) [59.7] |
| coloring material | carbon black PRINTEX 150T (Degussa) [6.5] | carbon black RAVEN 1020 (Colombian. Carbon K.K.) [7.0] | carbon black MONARCH 1300 (Cabot K.K.) [5.6] |
| resin | butyral resin BL-S (Sekisui Kagaku K.K.) [1.8] | butyral resin BM-1 (Sekisui Kagaku K.K.) [2.4] | butyral resin BM-2 (Sekisui Kagaku K.K.) [3.0] |
| additive (1) | isoborneol [1.5] | isoborneol [0.9] | methyl cellulose [1.0] |
| additive (2) | triethylamine [0.3] | triethanol amine [0.5] | triethanol amine [0.7] |
| additive (3) | — [ ] | glycerine [7.2] | water [30] | value in [ ] means wt %.

TABLE 3

|  | Example 7 | Example 8 | Example 9 |
|---|---|---|---|
| solvent | 1:1 mixture of diethylene glycol monobutyl ether & triethylene glycol monobutyl ether (bp 230–270° C.) [93.395] | 1:3 mixture of triethylene glycol monobutyl ether & butyl Cellosolve (bp 175–271° C.) [84.9] | ethylene glycol monobutyl ether & monopropyl (bp 155–171° C.) [87.8] |
| coloring material | carbon black MA-600 (Mitsubishi Kasei Kogyo K.K.) [5.7] | carbon black MEO SPECTRA MARK II (Colombian. Carbon K.K.) [6.5] | carbon black REGAL 99R (Cabot K.K.) [5.0] |
| resin | polyethylene glycol PEG 6000S (Sanyo Kasei K.K.) [0.9] | polyvinyl alcohol [0.05] | rosin resin lime resin No. 1 (Arakawa Kagaku Kogyo K.K.) [7.0] |
| additive (1) | Sodium alginate [0.005] | methyl cellulose [0.5] | ethyl cellulose [0.1] |
| additive (2) | — [ ] | — [ ] | propanol [0.1] |
| additive (3) | — [ ] | water [8.0] | — [ ] |
| another additive | — [ ] | cellulose sodium glycolate cellogen (Daiichi Kogyo Seiyaku K.K.) [0.05] | — [ ] | value in [ ] means wt %.

TABLE 4

|  | Example 10 | Example 11 | Example 12 |
|---|---|---|---|
| solvent | 5:1 mixture of 2-pyrrolidone & 1,2-propanediol (bp 188–245° C.) [41.8] | 8:1 mixture of 2-pyrrolidone & dipropylene glycol monomethyl ether (bp 188–245° C.) [77.72] | 1:1 mixture of 2-pyrrolidone & diethylene glycol monobutyl ether (bp 230–245° C.) [68.5] |
| coloring material | carbon black Special Black 550 (Degussa) [5.0] | carbon black MONARCH 1000 (Cabot K.K.) [4.2] | carbon black CONDUCTEX SC (Colombian. Carbon K.K.) [7.0] |
| resin | acrylic resin Collacral P (BASF) [1.5] | acrylic emulsion copolymer Acrysol ASE-75 (Rohm & Haas) [2.0] | rosin type resin rosin ester, Ester Gum A (Arakawa Kagaku Kogyo K.K.) [1.2] |
| additive (1) | ethyl cellulose [4.6] | ammonium alginate [1.0] | ester of sucrose [2.1] |
| additive (2) | triethanol amine [4.1] | propanol [0.08] | triethylamine [1.2] |
| additive (3) | water [43.0] | 10:1 mixture of water + formamide [15.0] | water [20.0] | value in [ ] means wt %.

TABLE 5

|  | Example 13 | Example 14 | Example 15 |
|---|---|---|---|
| solvent | triethylene glycol monobutyl ether (bp 271° C.) [92.7] | diethylene glycol monobutyl ether (bp 230° C.) [92.18] | tetraethylene glycol dimethyl ether (bp 279° C.) [89.53] |
| coloring material | carbon black CONDUC TEX 975 BEADS (Colombian. Carbon K.K.) [5.0] | carbon black MOGUL L (Cabot K.K.) [4.82] | carbon black MA-8 (Mitsubishi Kasei Kogyo K.K.) [7.1] |
| resin | sodium polyacrylate Acrysol GS (Rohm & Haas) [1.1] | butylcellulose [2.5] | rosin resin lime resin No. 2 (Arakawa Kagaku Kogyo K.K.) [2.0] |
| additive (1) | glucose [1.2] | ethyl cellulose [0.5] | Sodium alginate [1.3] |

TABLE 5-continued

|  | Example 13 | Example 14 | Example 15 |
|---|---|---|---|
| additive (2) | — [ ] | — [0 ] | triethylamine [0.07] | value in [ ] means wt %.

TABLE 6

|  | Example 16 | Example 17 | Example 18 |
|---|---|---|---|
| solvent | 2-pyrrolidone (bp 245° C.) [47.1] | diethylene glycol monobutyl ether (bp 230° C.) [90.33] | 2-pyrrolidone (bp 245° C.) [75.8] |
| coloring material | carbon black PRINTEX 150T (Degussa) [6.4] | carbon black RAVEN 1020 (Colombian. Carbon K.K.) [5.0] | carbon black MONARCH 1300 (Cabot K.K.) [5.8] |
| resin | polyethylene glycol PEG 5000S (Sanyo Kasei K.K.) [3.0] | butyral resin BL-2 (Sekisui Kagaku K.K.) [0.05] | polyvinyl alcohol [1.2] |
| additive (1) | borneol [1.5] | ethyl cellulose [2.0] | isoborneol [0.7] |
| additive (2) | — [ ] | hexanol [2.0] | triethanol amine [1.0] |
| additive (3) | water [42.0] | — [ ] | mixture of water and methanesulfonic acid [15.0] |
| additive | — [ ] | purified bentonite osmos #1500 (Shiraishi Kogyo K.K.) [0.02] | gelatin [0.5] | value in [ ] means wt %.

TABLE 7

|  | Example 19 | Example 20 | Example 21 |
|---|---|---|---|
| solvent | triethylene glycol monobutyl ether (bp 271° C.) [90.4] | diethylene glycol monobutyl ether (bp 195° C.) [69.4] | 3:1 mixture of diethylene glycol monobutyl ether & 2-pyrrolidone (bp 230–245° C.) [89.3] |
| coloring material | benzidine yellow, pigment yellow 13 (CI Pigment No.) [7.1] | benzidine yellow, pigment yellow 13 [6.8] | quinacridone red, pigment red 122 [5.8] |
| resin | butyral resin BM-1 (Sekisui Kagaku K.K.) [2.0] | acrylic resin Collacral P (BASF K.K.) [1.8] | polyethylene glycol PEG 6000S (Sanyo Kasei K.K.) [1.5] |
| additive (1) | ammonium alginate [0.1] | propyl cellulose [0.5] | sucrose ester [1.4] |
| additive (2) | triethanol amine [0.4] | propanol [1.5] | hexanol [2.0] |
| additive | — | water | — |

TABLE 7-continued

|  | Example 19 | Example 20 | Example 21 |
|---|---|---|---|
| (3) | [ ] | [20.0] | [ ] | value in [ ] means wt %.

TABLE 8

|  | Example 22 | Example 23 | Example 24 |
|---|---|---|---|
| solvent | 9:1 mixture of 2-pyrrolidone & butyl Cellosolve (bp 175–245° C.) [63.1] | diethylene glycol monobutyl ether (bp 195° C.) [92.9] | ethylene glycol monobutyl ether (bp 171° C.) [52.2] |
| coloring material | quinacridone red, pigment red 122 [6.0] | copper phthalocyanine blue, pigment blue 15 [4.0] | copper phthalocyanine blue, pigment blue 15 [5.5] |
| resin | rosin type resin rosin ester, Ester Gum A (Arakawa Kagaku Kogyo K.K.) [2.4] | polyvinyl alcohol [1.2] | butyral resin BL-S (Sekisui Kagaku K.K.) [1.8] |
| additive (1) | borneol [2.0] | borneol [0.9] | Sodium alginate [3.5] |
| additive (2) | propanol [1.5] | triethylamine [1.0] | triethanol amine [2.0] |
| additive (3) | water [25.0] | — [ ] | water [35] | value in [ ] means wt %.

TABLE 9

|  | Example 25 | Example 26 | Example 27 |
|---|---|---|---|
| solvent | triethylene glycol monobutyl ether (bp 271° C.) [92.51] | diethylene glycol monobutyl ether (bp 195° C.) [58.4] | 3:2 mixture of diethylene glycol monobutyl ether & 2-pyrrolidone (bp 230–245° C.) [92.65] |
| coloring material | benzidine yellow, pigment yellow 13 (CI Pigment No.) [5.8] | benzidine yellow, pigment yellow 13 [7.0] | quinacridone red, pigment red 122 [5.8] |
| resin | butyral resin (molecular weight 6000) [0.1] | acrylic resin Collacral P (BASF K.K.) [2.1] | polyethylene glycol PEG 6000S (Sanyo Kasei K.K.) [0.5] |
| additive (1) | ammonium alginate [0.09] | methyl cellulose [2.1] | sucrose ester [0.05] |
| additive (2) | triethanol amine [1.5] | propanol [0.5] | hexanol [1.0] |
| additive (3) | — [ ] | water [30.0] | — [ ] | value in [ ] means wt %.

TABLE 10

|  | Example 28 | Example 29 | Example 30 |
|---|---|---|---|
| solvent | 9:1 mixture | diethylene | 1:1 mixture |

TABLE 10-continued

|  | Example 28 | Example 29 | Example 30 |
|---|---|---|---|
|  | of 2-pyrrolidone & 1-hexanol (bp 158–245° C.) [63.5] | glycol monobutyl ether (bp 195° C.) [93.7] | of 2-pyrrolidone & ethylene glycol monobutyl ether (bp 171–245° C.) [68.2] |
| coloring material | quinacridone red, pigment red 122 [6.5] | copper phthalocyanine blue, pigment blue 15 [4.9] | copper phthalocyanine blue, pigment blue 15 [5.5] |
| resin | rosin type resin rosin ester, Ester Gum A (Arakawa Kagaku Kogyo K.K.) [1.5] | polyvinyl alcohol [0.4] | butyral resin (molecular weight 8000) [3.0] |
| additive (1) | borneol [1.5] | borneol [0.5] | Konjak powder [2.1] |
| additive (2) | propanol [2.0] | triethylamine [0.5] | triethanol amine [1.2] |
| additive (3) | water [25.0] | — [ ] | water [20.0] | value in [ ] means wt %.

TABLE 11

|  | Comparative Example 1 | Comparative Example 2 |
|---|---|---|
| solvent | diethylene glycol monobutyl ether (bp 230° C.) [92.5] | 2-pyrrolidone (bp 245° C.) [75.7] |
| coloring material | carbon black MOGULL (Cabot K.K.) [5.0] | carbon black MONARCH 1300 (Cabot K.K.) [5.6] |
| resin | butyral resin BL-2 (Sekisui Kagaku K.K.) [2.5] | butyral resin BL-2 (Sekisui Kagaku K.K.) [3.0] |
| additive (1) | — | — |
| additive (2) | — [ ] | triethanol amine [0.7] |
| additive (3) | — [ ] | water [15] |
| comment | no borneol, compared with Ex. 2. | no additive (1) compared with Ex. 6. | value in [ ] means wt %.

TABLE 12

|  | Comparative Example 3 | Comparative Example 4 |
|---|---|---|
| solvent | diethylene glycol monobutyl ether (bp 230° C.) [93.4995] | diethylene glycol monobutyl ether (bp 230° C.) [88.0] |
| coloring material | carbon black CONDUC TEX 975 BEADS (Colombian.Carbon K.K.) [5.0] | carbon black CONDUC TEX 975 BEADS (Colombian.Carbon K.K.) [5.0] |
| resin | butyral resin BL-1 (Sekisui Kagaku K.K.) [1.5] | butyral resin BL-1 (Sekisui Kagaku K.K.) [1.5] |
| additive (1) | borneol [0.5] | borneol [0.5] |
| additive (2) | — [ ] | — [ ] |
| additive (3) | — [ ] | — [ ] |
| comment | 0.001% or less of borneol (additive (1)), compared with Ex. 1. | 5% or more of borneol, compared with Ex. 1. | value in [ ] means wt %.

TABLE 13

|  | Comparative Example 5 | Comparative Example 6 | Comparative Example 7 |
|---|---|---|---|
| solvent | 1:1 mixture of 2-pyrrolidone & diethylene glycol monobutyl ether (bp 230–245° C.) [68.5] | 2-pyrrolidone (bp 245° C.) [89.9] | diethylene glycol monobutyl ether (bp 230° C.) [95.0] |
| coloring material | nigrosine dye Nigrosine NB conc. (Sumitomo Kagaku K.K.) [7.0] | nigrosine dye Orient Nigrosine BR (Orient Kagaku K.K. [6.5] | carbon black MOGULL (Cabot K.K.) [5.0] |
| resin | rosin type resin rosin ester, Ester Gum A (Arakawa Kagaku Kogyo K.K.) [1.2] | butyral resin BL-S (Sekisui Kagaku K.K.) [1.8] | — |
| additive (1) | ester of sucrose [2.1] | isoborneol [1.5] | — |
| additive (2) | triethylamine [1.2] | triethylamine [0.3] | — |
| additive (3) | water [20.0] | — [ ] | — |
| comment | dye was used instead of pigment in Ex. 12. | dye was used instead of pigment Ex. 4. | no resin, and no additive (1), compared with Ex. 2. | value in [ ] means wt %.

Evaluation of Ink

With respect to the resulting recording solutions for ink jetting, viscosity, dispersibility, bleeding, opposite-side bleeding, fixing properties, light-resistance, density and water-resistance are evaluated. The results were summarized in Tables 14-23.

Viscosity was measured by a precision viscometer (Low shear 30; made by Contraves K.K.), under constant conditions set at the temperature of 25 ° C.

Figure 1A:
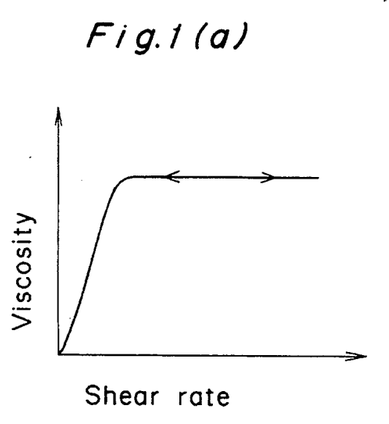
Figure 1B:
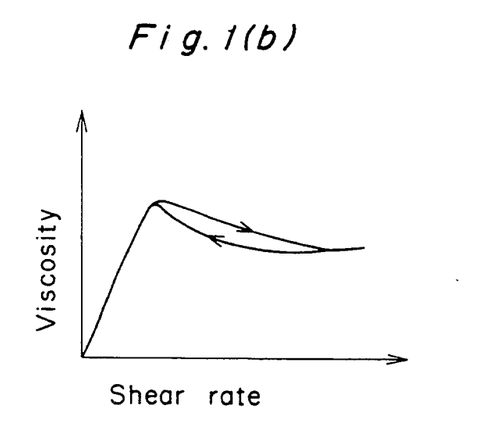

A viscosity change was also measured when a shearing stress was applied. The dependence of viscosity on shear stress was evaluated. For example, when viscosity and shear rate has a relationship as shown in FIG. 1 (a), the dispersibility is good. When viscosity and shear rate has a relationship as shown in FIG. 1 (b), the dispersibility is poor.

Surface tension was measured by a surface tension balance (CBVP-A3; made by Kaimen Kagaku Kogyo K.K.), under constant conditions set at the temperature of 25 ° C.

Dispersibility was evaluated from the dependence of viscosity on shear rate as described above. In more detail, thermal shock was applied to ink such that ink was subjected four times a day to a heating cycle between −20 ° C. and 90 ° C. while each temperature was kept for one hour. Changes of graphs were studied to be ranked as below:

o: No change after and before the test. Dispersibility is good.

x: Change after and before the test. Separation and aggregation are observed after long-term preservation.

Bleeding was measured by an evaluating machine provided with a X-Y plotter (having programming system) and a plotting pen (made originally by Minolta Camera K.K., available on the market). The plotter having a nib of inner diameter of 0.1, 0.2, 0.3, 0.5 mm or similar sizes) was connected to a microdispenser. Then the ratio of spreading (bleeding) of ink to the inner diameter was measured to be ranked as below. In this test, EP paper used usually for a copying machine made by Minolta camera K.K. was used.

⊚: spreading ratio of 0—less than 10 %
o: spreading ratio of 10—less than 20 %
Δ: spreading ratio of 20—less than 30 %
x: spreading ratio of 30 % or more The rank of o or higher is preferable.

Opposite-side bleeding was measured in a manner similar to that in evaluation of bleeding. The pen of inner diameter of 0.5 mm was used. Black solid images of mm² were printed. The reflective density of the paper itself was subtracted from that of images on opposite side to be ranked as below. The reflective density was measured by Sakura Densitometer PDA-65 (made by Konishiroku Shashin Kogyo K.K.)

⊚: less than 0.1.
o: 0.1—less than 0.2
Δ: 0.2—less than 0.3
x: more than 0.3

The rank of 'o' or higher is preferable.

Fixing properties (fixing rate); Black solid images were printed in a manner similar to that in evaluation of opposite-side bleeding. After specified time from the formation of the images, a blade made of polyurethane or a similar substance (cleaning blade for a copying machine made by Minolta Camera K.K.) was scanned on the paper like a wiper under no loaded conditions. The time when ink stains were not formed by the scanning of the blade was measured to be ranked.

⊚: less than 2.5 seconds
o: 2.5—less than 5 seconds
": 5—less than 10 seconds
x: more than 10 seconds.

The rank of 'o' or higher is preferable.

Light-Resistance; Black solid images were printed in a manner similar to that in evaluation of opposite-side bleeding. The initial reflective density ($I_0$) was measured. Then the images were exposed to fluorescent lighting of 5000 lux to be degraded. The reflective density ($I_1$) was again measured. The ratio ($I_1/I_0$) (%) was calculated to be evaluated as below:

⊚: 100 %—98 % or more
o: less than 98 %—96 % or more
Δ: less than 96 %—94 % or more
x: less than 94 %

The rank of 'o' or higher is preferable.

Water Resistance; Black solid images were printed in a manner similar to that in evaluation of opposite-side bleeding. The resultant paper was immersed in purified water for 10 minutes. Then the paper was dried to measure image density. The lowering from the initial density was calculated to be ranked as below:

⊚: less than 0.1.
o: 0.1—less than 0.2
Δ: 0.2—less than 0.3
x: more than 0.3

The rank of 'o' or higher is preferable.

TABLE 14

|  | Example 1 | Example 2 | Example 3 | Example 4 |
|---|---|---|---|---|
| viscosity (cp); 25° C. | 10.5 | 8.9 | 5.4 | 14.2 |
| surface tension (dyne/cm) 25° C. | 29.4 | 31.8 | 32.0 | 33.0 |
| dispersibility | o | o | o | o |
| thermal shock 4 times of heat cycle (−20 ⇌ 90° C.) (keep time; 1 hour) bleeding | o | o | o | o |
| opposite-side bleeding | o | o | o | o |
| fixing properties (fixing rate) | ⊚ | ⊚ | ⊚ | ⊚ |
| light resistance, compared with dyes | ⊚ | ⊚ | ⊚ | ⊚ |
| density (I.D.) | o | o | o | o |
| water resistance, compared with dyes | ⊚ | ⊚ | ⊚ | ⊚ |

TABLE 15

|  | Example 5 | Example 6 | Example 7 | Example 8 |
|---|---|---|---|---|
| Viscosity (cp); 25° C. | 19.0 | 5.2 | 4.4 | 9.4 |
| surface tension (dyne/cm) 25° C. | 35.0 | 42.8 | 30.0 | 34.5 |
| dispersibility | o | o | o | o |
| thermal shock 4 times of heat cycle (−20 ⇌ 90° C.) (keep time; 1 hour) bleeding | ⊚ | ⊚ | o | ⊚ |
| opposite-side bleeding |  |  |  |  |
| fixing properties (fixing rate) | Δ | o | ⊚ | o |
| light resistance, compared with dyes | ⊚ | ⊚ | ⊚ | ⊚ |
| density (I.D.) | o | o | o | o |
| water resistance, compared with dyes | o | o | ⊚ | o |

TABLE 16

|  | Example 9 | Example 10 | Example 11 | Example 12 |
|---|---|---|---|---|
| viscosity (cp); 25° C. | 3.8 | 6.6 | 7.4 | 6.7 |
| surface tension (dyne/cm) 25° C. | 31.0 | 50.2 | 38.0 | 41.5 |
| dispersibility | o | o | o | o |
| thermal shock 4 times of heat cycle (−20 ⇌ 90° C.) (keep time; 1 hour) bleeding | o | ⊚ | ⊚ | ⊚ |
| opposite-side bleeding | o | ⊚ | ⊚ | ⊚ |
| fixing properties (fixing rate) | ⊚ | o | o | o |
| light resistance, compared with dyes | ⊚ | ⊚ | ⊚ | ⊚ |
| density (I. D.) | o | o | o | o |
| water resistance, compared with dyes | ⊚ | o | o | o |

TABLE 17

|  | Example 13 | Example 14 | Example 15 | Example 16 |
|---|---|---|---|---|
| viscosity (cp); 25° C. | 9.5 | 7.1 | 14.1 | 5.4 |
| surface tension (dyne/cm) 25° C. | 30.0 | 32.1 | 29.5 | 44.2 |
| dispersibility | o | o | o | o |
| thermal shock 4 times of heat |  |  |  |  |

TABLE 17-continued

|  | Example 13 | Example 14 | Example 15 | Example 16 |
|---|---|---|---|---|
| cycle (−20 ⇌ 90° C.) (keep time; 1 hour) |  |  |  |  |
| bleeding | ○ | ○ | ○ | ◎ |
| opposite-side bleeding | ○ | ○ | ○ | ◎ |
| fixing properties (fixing rate) | ◎ | ◎ | ◎ | ○ |
| light resistance, compared with dyes | ◎ | ◎ | ◎ | ◎ |
| density (I. D.) | ○ | ○ | ○ | ○ |
| water resistance, compared with dyes | ◎ | ◎ | ◎ | ○ |

TABLE 18

|  | Example 17 | Example 18 | Example 19 | Example 20 |
|---|---|---|---|---|
| viscosity (cp); 25° C. | 6.9 | 8.2 | 9.5 | 3.4 |
| surface tension (dyne/cm) 25° C. | 30.5 | 36.3 | 29.7 | 40.7 |
| dispersibility | ○ | ○ | ○ | ○ |
| thermal shock 4 times of heat cycle (−20 ⇌ 90° C.) (keep time; 1 hour) |  |  |  |  |
| bleeding | ◎ | ◎ | ○ | ◎ |
| opposite-side bleeding | ◎ | ◎ | ○ | ◎ |
| fixing properties (fixing rate) | ○ | ○ | ◎ | ○ |
| light resistance, compared with dyes | ◎ | ◎ | ◎ | ◎ |
| density (I. D.) | ○ | ○ | ○ | ○ |
| water resistance, compared with dyes | ○ | ○ | ◎ | ○ |

TABLE 19

|  | Example 21 | Example 22 | Example 23 | Example 24 |
|---|---|---|---|---|
| viscosity (cp); 25° C. | 3.2 | 6.0 | 7.0 | 2.5 |
| surface tension (dyne/cm) 25° C. | 30.4 | 41.7 | 31.2 | 42.5 |
| dispersibility | ○ | ○ | ○ | ○ |
| thermal shock 4 times of heat cycle (−20 ⇌ 90° C.) (keep time; 1 hour) |  |  |  |  |
| bleeding | ○ | ◎ | ○ | ◎ |
| opposite-side bleeding | ○ | ◎ | ○ | ◎ |
| fixing properties (fixing rate) | ◎ | ○ | ◎ | ○ |
| light resistance, compared with dyes | ◎ | ◎ | ◎ | ◎ |
| density (I. D.) | ○ | ○ | ○ | ○ |
| water resistance, compared with dyes | ◎ | ○ | ◎ | ○ |

TABLE 20

|  | Example 25 | Example 26 | Example 27 |
|---|---|---|---|
| viscosity (cp); 25° C. | 9.0 | 3.9 | 4.8 |
| surface tension (dyne/cm) 25° C. | 30.8 | 43.0 | 33.3 |
| dispersibility | ○ | ○ | ○ |
| thermal shock 4 times of heat cycle (−20 ⇌ 90° C.) (keep time; 1 hour) |  |  |  |
| bleeding | ○ | ◎ | ○ |
| opposite-side bleeding | ○ | ◎ | ○ |
| fixing properties (fixing rate) | ◎ | ○ | ◎ |
| light resistance, compared with dyes | ◎ | ◎ | ◎ |
| density (I. D.) | ○ | ○ | ○ |
| water resistance, compared with dyes | ◎ | ○ | ◎ |

TABLE 21

|  | Example 28 | Example 29 | Example 30 |
|---|---|---|---|
| viscosity (cp); 25° C. | 6.1 | 7.0 | 5.2 |
| surface tension (dyne/cm) 25° C. | 42.4 | 31.4 | 40.8 |
| dispersibility | ○ | ○ | ○ |
| thermal shock 4 times of heat cycle (−20 ⇌ 90° C.) (keep time; 1 hour) |  |  |  |
| bleeding | ◎ | ○ | ◎ |
| opposite-side bleeding | ◎ | ○ | ◎ |
| fixing properties (fixing rate) | ○ | ◎ | ○ |
| light resistance, compared with dyes | ◎ | ◎ | ◎ |
| density (I. D.) | ○ | ○ | ○ |
| water resistance, compared with dyes | ○ | ◎ | ○ |

TABLE 22

|  | Comparative Example 1 | Comparative Example 2 | Comparative Example 3 | Comparative Example 4 |
|---|---|---|---|---|
| viscosity (cp); 25° C. | 7.4 | 8.4 | 8.5 | 12.4 |
| surface tension (dyne/cm) 25° C. | 31.0 | 42.0 | 29.2 | 30.3 |
| dispersibility | x | x | x | x |
| thermal shock 4 times of heat cycle (−20 ⇌ 90° C.) (keep time; 1 hour) |  |  |  | secondary aggregation |
| bleeding | x | △ | x | △ |
| opposite-side bleeding | x | △ | x | △ |
| fixing properties (fixing rate) | ◎ | ○ | ○ | ○ |
| light resistance, compared with dyes | ◎ | ◎ | ◎ | ◎ |
| density (I. D.) | △ bleeding | △ bleeding | △ bleeding | △ bleeding |
| water resistance, compared with dyes | ◎ | ○ | ○ | ○ |

TABLE 23

|  | Comparative Example 5 | Comparative Example 6 | Comparative Example 7 |
|---|---|---|---|
| viscosity (cp); 25° C. | 5.4 | 14.0 | 7.0 |
| surface tension (dyne/cm 25° C. | 43.0 | 34.12 | 35.5 |
| dispersibility | — | — | x |
| thermal shock 4 times of heat cycle (−20 ⇌ 90° C.) (keep time; 1 hour) |  |  |  |
| bleeding | ○ | ○ | x |
| opposite-side | ○ | ○ | x |

TABLE 23-continued

| | Comparative Example 5 | Comparative Example 6 | Comparative Example 7 |
|---|---|---|---|
| bleeding fixing properties (fixing rate) | o | o | x |
| light resistance, compared with dyes | x | x | o |
| density (I. D.) | Δ | Δ | x bleeding |
| water resistance, compared with dyes | x | x | Δ |

The ink prepared in Example 1 of Table 1 was put in a remodeled printer head installed in an ink-jetting printer (COLOR IMAGEJET IO-735X; made by Sharp K.K.) to give excellent printed images without opposite-side bleeding.

The ink prepared in Example 6 of Table 2 was put in a remodeled printer head installed in a bubble-jetting printer (BJ-10V: made by Canon K.K.) to give excellent printed images without opposite-side bleeding.

The ink prepared in Example 10 of Table 4 was put in a printer head installed in an ink-jetting printer shown in FIG. 3 of Japanese Patent Application Hei-3 296798 to give excellent printed images without opposite-side bleeding.

PRODUCTION EXAMPLE 2 OF RECORDING SOLUTION FOR INK JETTING (Examples 31–37)

Solvents, pigments, dispersing agents and additives as shown in Tables 24 and 25 were treated under the following conditions:

In Examples 31–34, for 4 hours in a paint conditioner (made by Red Devil K.K.),

In Example 35, for 2 hours in a circulating Homogenizer of ultrasonic-wave type (made by Nippon Seiki K.K.), In Examples 36–37, for 1.5 hours in a dispersing machine UT-20 of ultrasonic-wave type (made by Shinmeidai Kogyo K.K.),

TABLE 24

| | Example 31 | Example 32 | Example 33 | Example 34 |
|---|---|---|---|---|
| solvent | triethylene glycol monobutyl ether (bp 271° C.) [92.5] | diethylene glycol monobutyl ether (bp 230° C.) [86.2] | dipropylene glycol monoethyl ether (bp 162–228° C.) [87.7] | 2-pyrrolidone (bp 245° C.) [80.4] |
| coloring material | carbon black CONDUC TEX 975 BEADS (Colombian. Carbon K.K.) [4.0] | carbon black MOGUL L (Cabot K.K.) [6.0] | carbon black MA-8 (Mitsubishi Kasei Kogyo K.K.) [4.2] | carbon black PRINTEX 150T (Degussa K.K) [6.5] |
| resin | butyral resin BL-1 (Sekisui Kagaku K.K.) [1.5] | butyral resin BL-2 (Sekisui Kagaku K.K.) [2.5] | butyral resin BL-3 (Sekisui Kagaku K.K.) [2.0] | butyral resin BL-S (Sekisui Kagaku K.K.) [1.8] |
| additive (1) | borneol [0.003] | borneol [4.5] | methyl cellulose [2.1] | isoborneol [1.5] |
| additive (2) | — | — | — | triethylamine [0.3] |
| dye | Discotton Fast Black D Mitsubishi Kasei Kogyo K.K. [0.5] | Direct Fast Black B Hodogaya Kagaku Kogyo K.K. [0.8] | Direct Deep Black EX Mitsubishi Kasei Kogyo K.K. [4.0] | Kayanol Milling Black VLG Nihon Kayaku K.K. [9.5] | value in [ ] means wt %.

TABLE 25

| | Example 35 | Example 36 | Example 37 |
|---|---|---|---|
| solvent | triethylene glycol monobutyl ether (bp 271° C.) [91.5] | 9:1 mixture of 2-pyrrolidone & butyl Cellosolve (bp 175–245° C.) [66.6] | diethylene glycol monobutyl ether (bp 195° C.) [90.9] |
| coloring material | benzidine yellow, pigment yellow 13 (CI Pigment No.) [5.0] | quinacridone red, pigment red 122 [5.5] | copper phthalocyanine blue, pigment blue 15 [5.5] |
| resin | butyral resin BM-1 (Sekisui Kagaku K.K.) [2.0] | rosin type resin rosin ester, Ester Gum A (Arakawa Kagaku Kogyo K.K.) [2.4] | polyvinyl alcohol [1.2] |
| additive (1) | ammonium alginate [0.1] | borneol [2.0] | borneol [0.9] |
| additive (2) | triethanol amine [0.4] | propanol [1.5] | — |
| additive (3) | — [ ] | water [20.0] | [ ] |
| dye | Direct Fast Yellow GC Hodogaya Kagaku Kogyo K.K. [1.0] | Alizarine Rubinol R Kabushiki Kaisha Yamada Kagaku Kenkyujo [2.0] | Orient Soluble Blue OBB Orient Kagaku Kogyo K.K. [1.5] | value in [ ] means wt %.

Evaluation of Ink

Light-transmittance was evaluated on ink prepared in Examples 35–37 as below.

Light-transmittance

Solid images of 5 mm² were printed on an OHP sheet (OHP film IN-0030; made by Sharp K.K.) in a manner similar to that in evaluation of bleeding. Then the printed images on the sheet were projected by an OHP machine to be evaluated visually. The evaluation was ranked as below:

⊚: clearly projected
o: clearly projected, but a little cloudy
Δ: blackish, but distinguishable
x: no desired color, black The ink of Example 35 demonstrated the rank "o". The ink of Examples 36 and 37 demonstrated the rank "⊚"

PRODUCTION EXAMPLE 3 of RECORDING SOLUTION FOR INK JETTING (Examples 38–41)

Production of Coloring Particles 1 (coloring material)

90 g of methylene chloride was poured into a beaker of 200 ml capacity. 2 g of pigment (carbon black, MOGUL L; made by Cabot K.K.) and 20 g of polyester with high molecular weight of 20 g were added into the solution at room temperature while stirring to give a polymer solution.

500 ml of water was taken in a beaker of 1 liter capacity. 0.5 g of sodium dodecylbenzenesolfonate and 5.0 g of a derivative of cellulose (Metoose 65SH-50; made by Shinetsu Kagaku K.K.) were added into the water. Then the solution was stirred for 2 hours without heating and the added materials were dissolved in the water to give an aqueous dispersion solution.

The obtained aqueous dispersion solution of 200 ml was taken into a beaker of 500 ml capacity to be stirred by HOMO MIXER at 9000 rpm. The above polymer solution was further added to the beaker and stirred for 10 minutes. The resultant solution was stirred slowly at 200 rpm while stirring for 2 hours to remove methylene chloride. Thus coloring particles 1 having mean particle size of 1.5 μm were obtained.

Production of Coloring Particles 2

Coloring particles 2 having mean particle size of 0.9 μm were prepared in a manner similar the Production Example of Coloring Particles 1, except that dye (Diacotton Fast Black D; made by Mitsubishi Kasei K.K.) was used instead of the pigment.

Production of Coloring Particles 3

50 g of tridecyl methacrylate of 3 g of, n-butyl methacrylate, 80 g of silicone oil SH-556 (made by Toray Silicone K.K.), 0.5 g of 2,2'-azobisisobutyronitrile (catalyst), 5 g of Oil Blue A (dye) (made by Dupon K.K.) were placed in a ball mill and mixed for 3 hours to give blue ink. 20 g of Takenate D-102 (made by Takeda Yakuhin Kogyo K.K.) was added to the blue ink and stirred. The obtained solution was emulsified and dispersed in 1 liter of 10 % aqueous solution of gum arabic while stirring at 9000 rpm by AUTO HOMO MIXER (made by Tokusyu Kiko K.K.). After a mean particle size of emulsified oil particles were adjusted to about 1.2 μm, 30 g of a 10 % aqueous solution of hexamethylenediamine were dropped into the above dispersion solution. The obtained solution was stirred at 50° C. at 4500 rpm for 2 hours and further at 75° C. for 6 hours to complete encapsulation. The obtained encapsulized particles were precipitated naturally. The supernatant liquid was replaced with water. Such a treatment was repeated 6–8 times. The encapsulized particles were filtered and dried in an oven at 60° C. for 8 hours to give coloring particles 3 having mean particle size of 1.3 μm.

Solvents, coloring materials, dispersing agents and additives as shown in Table 26 were treated under the following conditions:

In Examples 38 and 39, for 4 hours in a paint conditioner (made by Red Devil K.K.), In Examples 40 and 41, for 2 hours in a circulating homogenizer of ultrasonic-wave type (made by Nippon Seiki K.K.),

TABLE 26

| | Example 38 | Example 39 | Example 40 | Example 41 |
|---|---|---|---|---|
| solvent | 1:1 mixture of diethylene glycol monobutyl ether & triethylene glycol monobutyl ether (bp 230–270° C.) [93.395] | 2:1 mixture of triethylene glycol monobutyl ether & butyl Cellosolve (bp 175–271° C.) [81.2] | tetraethylene glycol dimethyl ether (bp 279° C.) [89.53] | 2-pyrrolidone (bp 245° C.) [47.1] |
| resin | polyethylene glycol PEG 6000S (Sanyo Kasei K.K.) [0.9] | polyvinyl alcohol [0.05] | rosin resin lime resin No. 2 (Arakawa Kagaku Kogyo K.K.)[2.0] | polyethylene glycol PEG 5000S (Sanyo Kasei K.K.) [3.0] |
| additive (1) | Sodium alginate [0.005] | methyl cellulose [0.5] | Sodium alginate [1.3] | borneol [1.5] |
| additive (2) | — [ ] | — [ ] | triethylamine [0.07] | — [ ] |
| additive (3) | — [ ] | water [8.0] | — [ ] | water [42.0] |
| another additive | — [ ] | cellulose sodium glycolate cellogen (Daiichi Kogyo Seiyaku K.K.) [0.05] | — [ ] | — [ ] |
| coloring material | coloring particles 1 [5.7] | coloring particles 2 [10.2] | coloring particles 3 [7.1] | coloring particles 3 [6.4] | value in [ ] means wt %.

Evaluation of Ink

Fixing Properties were evaluated on ink prepared in Examples 38–41 as below.

Fixing Properties

Solid images of 5 mm$^2$ were printed on EP paper for copying machine made by Minolta Camera in a manner similar to that in evaluation of bleeding. Then the paper was passed through a heat-fixing apparatus (remodeled copying apparatus of a copying machine EP-4321; made by Minolta Camera K.K. to fix printed images. Sand eraser (made by Lion K.K.) was prepared to have vertical surface. The sand eraser was pressed against the printed paper with angle of contact of 45 degrees under loaded conditions of 1000 g. Then, the sand eraser was reciprocated on the surface of the paper three times at the speed of 2 cm/sec. Reflective densities were measured before and after reciprocation of the sand eraser by Sakura Densitometer PDA-65 (made by Konishiroku Shashin Kogyo). The lowering of density was evaluated to be ranked as below:

⊙: Lowering of density is within 5%
o: Lowering of density is within 10%
Δ: Lowering of density is within 30%
x: Lowering of density is 30% or more The ink of all Examples 38–41 all demonstrated the evaluation rank of '⊙'.

What is claimed is:

1. A recording solution for ink jetting comprising:

at least 55 percent by weight of a nonaqueous solvent having a boiling point of at least 150° C. as a dispersing medium, 1–20 percent by weight of at least one of coloring materials selected from the group consisting of pigments, resin particles having a pigment dispersed therein and micro-capsule particles containing a dye or a pigment therein, said coloring material being insoluble in the nonaqueous solvent, 0.01–10 percent by weight of at least one of resins selected from the group consisting of butyral resins, acrylic resins, alkylene glycol resins, rosin resins, polyvinyl alcohol resins and polyvinyl pyrrolidone resins, and 0.001–5 percent by weight of at least one of additives selected from the group consisting of alginates and borneols.

2. A recording solution for ink jetting of claim 1, in which the nonaqueous solvent is selected from the group consisting of alkylene glycol alkyl ethers, alkylene glycol alkyl ether acetates, pyrrolidones and mixtures thereof.

3. A recording solution for ink jetting of claim 1, further comprising 0.05–5 percents by weight of a humectant selected from the group consisting of aliphatic alcoholamines, alkylamines and aliphatic lower alcohols.

4. A recording solution for ink jetting of claim 1, further comprising 0.05–5 percent by weight of an emulsifying agent selected from aromatic polyglycol ether, alkyl aryl polyglycol ether and sorbitan monooleate.

5. A recording solution for ink jetting of claim 1, further comprising 0.05–5 percents by weight of a drying-preventive agent selected from alkyl naphthalene sulfonates and alkyl aryl sulfonates.

6. A recording solution for ink jetting of claim 1, further comprising 7–45 percent by weight of at least one of the compounds selected from water, 2, 2'-dithio-ethanol, formamide, glycerin, ethylene carbonate and methanesulfonic acid.

7. A recording solution of claim 1, in which the nonaqueous solvent is selected from the group consisting of heterocyclic alcohols, phenols, pyrrolidones and esters.

8. A recording solution of claim 1, wherein the nonaqueous solvent is selected from the group consisting of mono-ethylene glycol monobutyl ether, di-ethylene glycol monobutyl ether, triethylene glycol monobutyl ether, mono-propylene glycol monobutyl ether, di-propylene glycol monobutyl ether, tri-propylene glycol monobutyl ether, butyl Cellosolve and 2 pyrrolidone.

9. A recording solution of claim 1, wherein the mean particle size of the coloring materials is 0.001–30 μm.

10. A recording solution of claim 1, wherein the mean particle size of the coloring materials is 0.001–10 μm.

11. A recording solution of claim 1, wherein the mean particle size of the coloring materials is 0.01–4 μm.

12. A recording solution of claim 1, comprising 1.5–15 percent by weight of the coloring materials.

13. A recording solution for ink jetting comprising at least:

a nonaqueous solvent having a boiling point of at least 150° C. as a dispersing medium, 1–20 percent by weight of at least one of coloring materials selected from the group consisting of pigments, resin particles having a pigment dispersed therein and micro-capsule particles containing a dye or a pigment therein, said coloring material being insoluble in the nonaqueous solvent, 7–45 percent by weight of water, 0.01–10 percent by weight of at least one of resins selected from the group consisting of butyral resins, acrylic resins, alkylene glycol resins, rosin resins, polyvinyl alcohol resins and polyvinyl pyrrolidone resins, and 0.001–5 percent by weight of least one of additives selected from the group consisting of alginates and borneols.

14. A recording solution for ink jetting of claim 13, in which a content of the nonaqueous solvent is at least 40 percent by weight.

15. A recording solution for ink jetting of claim 13, in which a content of water is 10–45 percent by weight.

16. A recording solution of claim 13, in which the nonaqueous solvent is selected from the group consisting of heterocyclic alcohols, phenols, pyrrolidones and esters.

17. A recording solution of claim 13, wherein the nonaqueous solvent is selected from the group consisting of monoethylene glycol monobutyl ether, di-ethylene glycol monobutyl ether, tri-ethylene glycol monobutyl ether, mono-propylene glycol monobutyl ether, di-propylene glycol monobutyl ether, tripropylene glycol monobutyl ether, butyl Cellosolve and 2 pyrrolidone.

18. A recording solution of claim 13, wherein the mean particle size of the coloring materials is 0.001–30 μm.

19. A recording solution of claim 13, wherein the mean particle size of the coloring materials is 0.001–10 μm.

20. A recording solution of claim 13, wherein the mean particle size of the coloring materials is 0.01–4 μm.

21. A recording solution of claim 13, comprising 1.5–15 percent by weight of the coloring materials.

22. A recording solution for ink jetting comprising:

at least 55 percent by weight of a nonaqueous solvent having a boiling point of at least 150° C. as a dispersing medium, 0.5–10 percent by weight of at least one of coloring materials selected from the group consisting of pigments, resin particles having a pigment dispersed therein and micro-capsule particles containing a dye or a pigment therein, said coloring material being insoluble in the nonaqueous solvent, 0.5–10 percent by weight of a dye soluble in the nonaqueous solvent, 0.01–10 percent by weight of at least one of resins selected from the group consisting of butyral resins, acrylic resins, alkylene glycol resins, rosin resins, polyvinyl alcohol resins and polyvinyl pyrrolidone resins, and 0.001–5 percent by weight of at least one of additives selected from the group consisting of alginates and borneols.

23. A recording solution of claim 22, wherein the nonaqueous solvent is selected from the group consisting of mono-ethylene glycol monobutyl ether, di-ethylene glycol monobutyl ether, triethylene glycol monobutyl ether, mono-propylene glycol monobutyl ether, di-propylene glycol monobutyl ether, tri-propylene glycol monobutyl ether, butyl Cellosolve and 2 pyrrolidone.

24. A recording solution of claim 22, wherein the mean particle size of the coloring materials is 0.001–30 µm.

25. A recording solution of claim 22, wherein the mean particle size of the coloring materials is 0.001–10 µm.

26. A recording solution of claim 22, wherein the mean particle size of the coloring materials is 0.01–4 µm.

27. A recording solution of claim 22, comprising 1.5–15 percent by weight of the coloring materials.

28. A recording solution of claim 22, in which the nonaqueous solvent is selected from the group consisting of heterocyclic alcohols, phenols, pyrrolidones and esters.

29. A recording solution for ink jetting of claim 9, in which the total content of the coloring materials and the dyes is 1–20 percent by weight.

30. A recording solution for ink jetting of claim 22, in which a ratio of the coloring materials to the dye is within the range between 1:8 and 8:1.

* * * * *